United States Patent
Johnson

(10) Patent No.: US 9,038,545 B2
(45) Date of Patent: May 26, 2015

(54) PORTABLE CUSHION TRAY

(71) Applicant: Dan R. Johnson, Arcadia, OH (US)

(72) Inventor: Dan R. Johnson, Arcadia, OH (US)

( * ) Notice: Subject to any disclaimer, the term of this patent is extended or adjusted under 35 U.S.C. 154(b) by 0 days.

(21) Appl. No.: 14/281,252

(22) Filed: May 19, 2014

(65) Prior Publication Data

US 2014/0251187 A1 Sep. 11, 2014

Related U.S. Application Data

(62) Division of application No. 13/570,468, filed on Aug. 9, 2012, now Pat. No. 8,807,051.

(60) Provisional application No. 61/524,229, filed on Aug. 16, 2011.

(51) Int. Cl.
```
A43B 23/00    (2006.01)
A47G 9/10     (2006.01)
A47G 23/06    (2006.01)
B60N 2/46     (2006.01)
B60N 3/00     (2006.01)
B60N 3/10     (2006.01)
A47C 7/70     (2006.01)
A47B 23/06    (2006.01)
```

(52) U.S. Cl.
CPC .......... *A47G 9/1045* (2013.01); *A47G 23/0608* (2013.01); *B60N 2/4673* (2013.01); *B60N 2/4686* (2013.01); *B60N 3/002* (2013.01); *B60N 3/101* (2013.01); *B60N 3/102* (2013.01); *A47C 7/70* (2013.01); *A47B 23/06* (2013.01)

(58) Field of Classification Search
CPC .... A47C 7/70; A47G 23/0608; B60N 2/4673; B60N 2/4686; B60N 3/101; B60N 3/002; B60N 3/102
See application file for complete search history.

(56) References Cited

U.S. PATENT DOCUMENTS

| | | | | |
|---|---|---|---|---|
| 3,520,755 | A | * | 7/1970 | Raffaelli, Sr. et al. ..... 156/380.7 |
| 4,052,944 | A | | 10/1977 | Jennings |
| 4,784,712 | A | * | 11/1988 | Hoyle ............................ 156/213 |
| 4,788,916 | A | * | 12/1988 | Saxton ............................ 108/43 |
| 4,964,600 | A | * | 10/1990 | Lee ................................. 248/146 |
| 5,081,936 | A | * | 1/1992 | Drieling ........................... 108/43 |
| 5,090,334 | A | * | 2/1992 | Sutton .............................. 108/43 |
| 5,460,102 | A | * | 10/1995 | Pasmanick ....................... 108/43 |
| 5,527,091 | A | | 6/1996 | Gruber |
| 5,732,849 | A | | 3/1998 | Brooks |
| 5,911,472 | A | | 6/1999 | Toth |
| 5,979,337 | A | | 11/1999 | Clark et al. |
| 6,187,398 | B1 | * | 2/2001 | Eldridge ...................... 428/35.2 |
| 6,969,119 | B1 | * | 11/2005 | Jennings .................. 297/423.41 |
| 7,275,724 | B1 | * | 10/2007 | Ward .......................... 248/118.5 |
| 7,334,838 | B2 | * | 2/2008 | Pope ......................... 297/188.14 |
| D638,636 | S | | 5/2011 | Chauss et al. |
| 7,992,502 | B1 | * | 8/2011 | Davis .............................. 108/43 |
| 8,635,959 | B1 | * | 1/2014 | Silknitter ........................ 108/43 |
| 8,807,051 | B2 | * | 8/2014 | Johnson ........................... 108/43 |

(Continued)

*Primary Examiner* — Hanh V Tran
(74) *Attorney, Agent, or Firm* — Fraser Clemens Martin & Miller LLC; Jacob M. Ward, Esq.

(57) ABSTRACT

A portable cushion tray includes a cushion coupled to a tray. The tray has a first maximum perimeter. The cushion has a second maximum perimeter. The first maximum perimeter is one of the same as the second maximum perimeter and disposed inside of the second maximum perimeter. The portable cushion tray is used as a furniture accessory and selectively provides each of a pillow and a working surface for use with furniture.

5 Claims, 5 Drawing Sheets

(56) References Cited

U.S. PATENT DOCUMENTS

| | | | |
|---|---|---|---|
| 2005/0211138 A1* | 9/2005 | Gupta | 108/43 |
| 2007/0001359 A1* | 1/2007 | Pearl et al. | 269/289 R |
| 2007/0113757 A1* | 5/2007 | Lilly | 108/25 |
| 2007/0205205 A1* | 9/2007 | Kliewer | 220/737 |
| 2008/0041278 A1* | 2/2008 | Goldberg et al. | 108/26 |
| 2009/0034188 A1* | 2/2009 | Sween et al. | 361/687 |
| 2009/0235458 A1* | 9/2009 | Yarmer et al. | 5/639 |
| 2012/0060724 A1* | 3/2012 | Doss et al. | 108/43 |

* cited by examiner

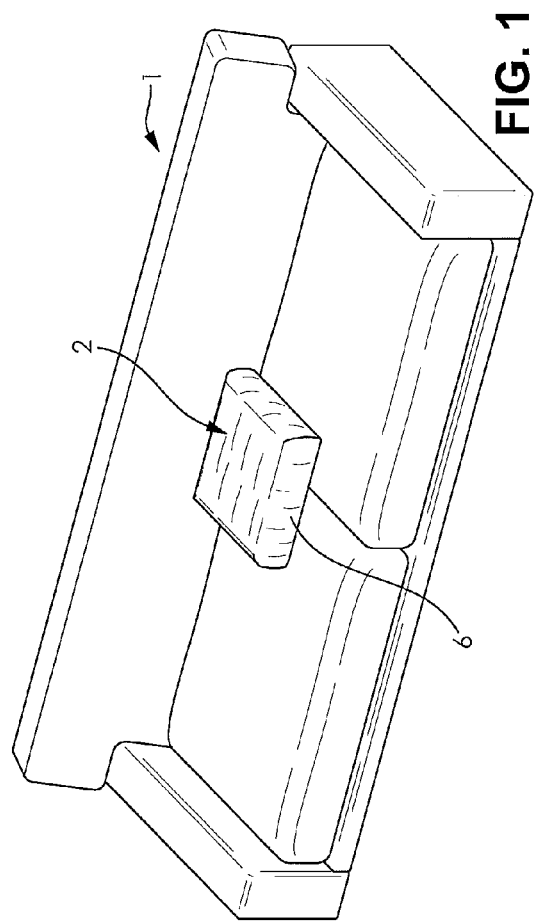
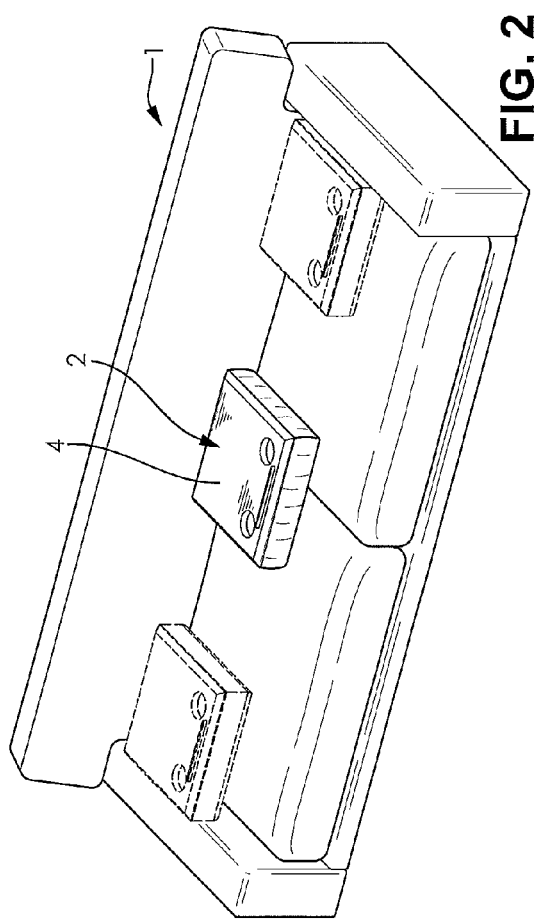

PORTABLE CUSHION TRAY

CROSS-REFERENCE TO RELATED APPLICATIONS

This application is a divisional of U.S. patent application Ser. No. 13/570,468, filed on Aug. 9, 2012, which in turn claims the benefit of U.S. Provisional Application No. 61/524,229, filed on Aug. 16, 2011. The entire disclosures of the above application are hereby incorporated herein by reference.

FIELD OF THE INVENTION

The present disclosure relates to furniture accessories and, more particularly, to a portable cushion tray for use with furniture.

BACKGROUND OF THE INVENTION

A couch or sofa is commonly found in homes. The typical couch can have a central console or fold down fixture, which may include cup holders or compartments for storing objects such as remote controls. However, the presence of the console or fold down fixture can undesirably limit the uses and number of persons who the couch may accommodate. A convenient location for placing food and other objects such as books and computers is also not provided by known furniture accessories.

There is a continuing need for a furniture accessory that may be used both as a cushion, and as a working surface for holding objects. Desirably, the furniture accessory is lightweight, easy to carry, simple to use, and straightforward to store.

SUMMARY OF THE INVENTION

In concordance with the instant disclosure, a furniture accessory that may be used both as a cushion, and as a working surface for holding objects, and which is lightweight, easy to carry, simple to use, and straightforward to store, is surprisingly discovered.

The present disclosure includes a portable cushion tray having a hard top and a cushion bottom. The portable cushion tray is an alternative to the fold down on couches. The hard top may have a dual purpose cup holder to accommodate cups, mugs, cans, glasses, etc. The portable cushion tray may also have a fluted joint to receive pencils, pens, etc. Optionally, the portable cushion tray has a hidden compartment for holding objects. The portable cushion tray can be manufactured to match a pattern and a style of any couch, love seat, chair, or other piece of furniture.

Advantageously, the portable cushion tray, instead of being stationary, can be moved easily to any location on the furniture and used as either a pillow or as a working surface. Moreover, the uses of the portable cushion tray are not limited to furniture, as the portable cushion tray may be used anywhere both a tray and a cushion are desired.

In one embodiment, a portable cushion tray includes a tray having a first maximum perimeter and a cushion having a second maximum perimeter. The cushion is coupled to the tray. The first maximum perimeter is one of the same as the second maximum perimeter and disposed inside of the second maximum perimeter.

In another embodiment, a furniture system includes a furniture piece having the portable cushion tray disposed thereon.

In a further embodiment, a portable cushion tray has formed therein an elongate fluted joint configured to hold a writing instrument. The tray further including a first aperture configured to hold a beverage container. The cushion includes an upholstery material enveloping a filler. The portable cushion tray also includes a holder for a beverage container and a backer board. The holder includes a flange. The backer board is disposed between the upholstery material and the tray. The backer board has a third maximum perimeter. The third maximum perimeter is one of the same as the first maximum perimeter and disposed inside of the first maximum perimeter. The backer board has a second aperture. The holder is disposed through the second aperture of the backer board and beneath the first aperture of the tray. The flange of the holder is disposed between the tray and the backer board. The first aperture of the tray and an upper surface of the flange of the holder cooperate to form a shoulder surface for supporting the beverage container. A first adhesive is disposed between and abuts an upper surface of the upholstery material and the tray. A second adhesive is disposed between and abuts a lower surface of the upholstery material and the backer board. A third adhesive is disposed between and abuts the tray and the backer board. A fourth adhesive is disposed between and abuts an upper surface of the flange of the holder and the tray. A sealant is disposed between and abuts a lower surface of the flange and the backer board.

DRAWINGS

The above, as well as other advantages of the present disclosure, will become readily apparent to those skilled in the art from the following detailed description, particularly when considered in the light of the drawings described hereafter.

FIG. 1 is a perspective view of a portable cushion tray according to one embodiment of the present disclosure, shown sitting on a couch and positioned with a cushion turned upwardly;

FIG. 2 is a perspective view of the portable cushion tray depicted in FIG. 1, shown sitting on the couch with the cushion turned downwardly, and further showing in dashed lines other possible locations for the portable cushion tray on the couch;

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the present disclosure, application, or uses. In respect of the methods disclosed, the order of the steps presented is exemplary in nature, and thus, is not necessary or critical.

FIGS. 1-6 show a portable cushion tray 2 according to one embodiment of the present disclosure. The portable cushion tray 2 includes both a tray 4 and a cushion 6. The tray 4 may be formed from a durable material such as a wood, a plastic, a metal, or a composite material, as non-limiting examples. Skilled artisans may select other suitable materials for the tray 4, as desired.

The tray 4 has a first maximum perimeter and the cushion 6 has a second maximum perimeter. The first maximum perimeter of the tray 4 may be defined by an edge of the tray 4. The edge of the tray 4 may have any desired shape, for example, the edge of the tray 4 may be beveled. The first maximum perimeter is one of the same as the second maximum perimeter, and disposed inside of the second maximum perimeter. It should be understood that the first maximum perimeter of the tray 4 being disposed within the second maximum perimeter of the cushion 6 advantageously permits the portable cushion tray 2 to be used as both a pillow on one side (shown in FIG. 1), and as a working surface on another side (shown in FIG. 2), on a furniture piece 1 as part of a furniture system.

Figure 3:
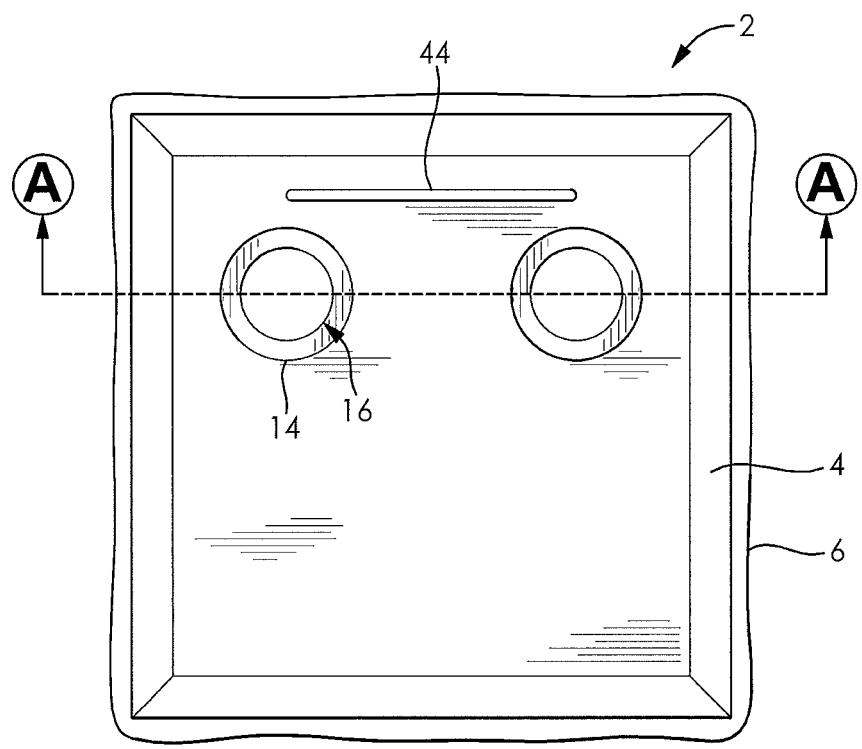
FIG. 3 is a top plan view of the portable cushion tray depicted in FIG. 1.
Figure 4:
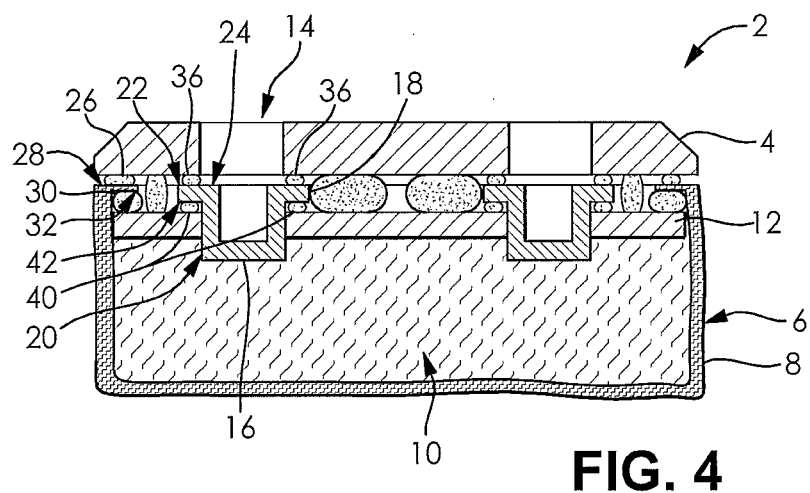
FIG. 4 is a side cross-sectional elevational view of the portable cushion tray taken along section line A-A in FIG. 3.
Figure 5:
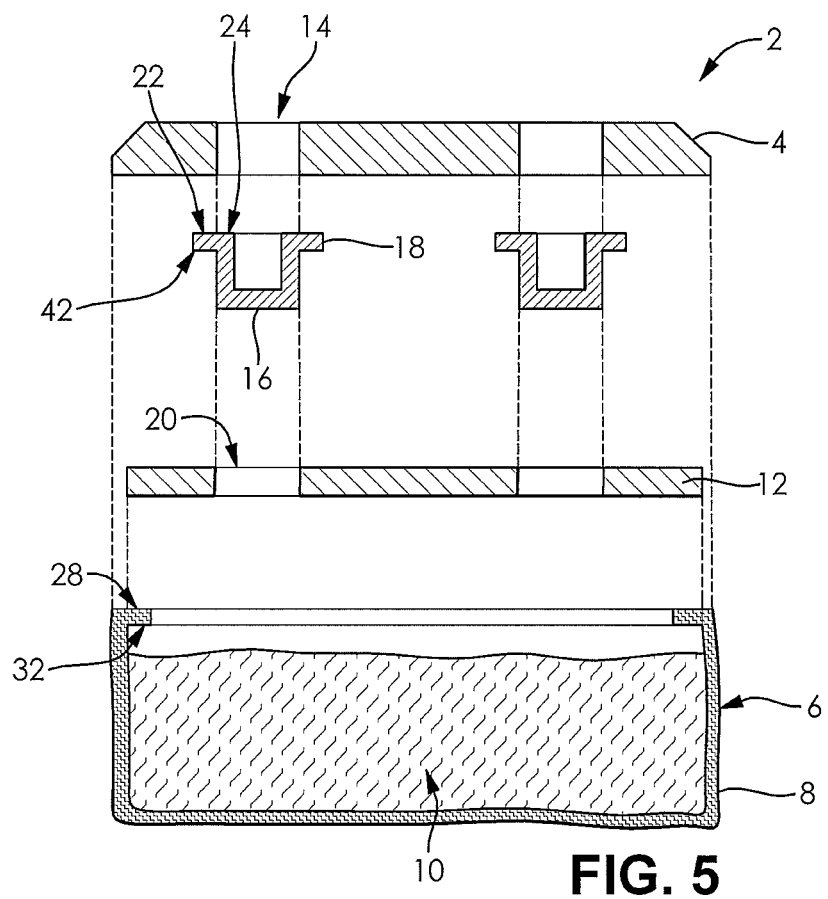
FIG. 5 is an exploded side cross-sectional elevational view of the portable cushion tray shown in FIG. 4, shown without adhesive.

As shown in FIGS. 4-5, the cushion 6 includes an upholstery material 8. As nonlimiting examples, the upholstery material 8 may include one of a woven fabric, a nonwoven fabric, and leather. Other types of materials for the upholstery material 8 may also be used within the scope of the disclosure. In particular embodiments, the upholstery material 8 is selected to match or complement the furniture piece 1 with which the portable cushion tray 2 is used.

The upholstery material 8 envelopes a filler 10 of the portable cushion tray 2. In one example, the filler 10 is a polyfill. In another example, the filler 10 is a polymeric foam. One of ordinary skill in the art may select other suitable types of materials for the filler 10, as desired.

It should be appreciated that the filler 10 may not completely fill the cushion 6. The cushion 6 thereby provides a self-leveling function to the portable cushion tray 2 as air from the cushion 6 is depleted when the portable cushion tray 2 is placed cushion-side down.

The portable cushion tray 2 of the present disclosure further includes a backer board 12. The backer board 12 is disposed between the upholstery material 8 and the tray 4. The backer board 12 has a third maximum perimeter that is one of the same as the first maximum perimeter of the tray 4 and disposed inside of the first maximum perimeter of the tray 4. Likewise, the third maximum perimeter is also one of the same as the second maximum perimeter of the cushion 6 and disposed inside of the second maximum perimeter of the cushion 6. Like the first maximum perimeter, the second maximum perimeter allows the portable cushion tray 2 to be used as a pillow.

Figure 6:
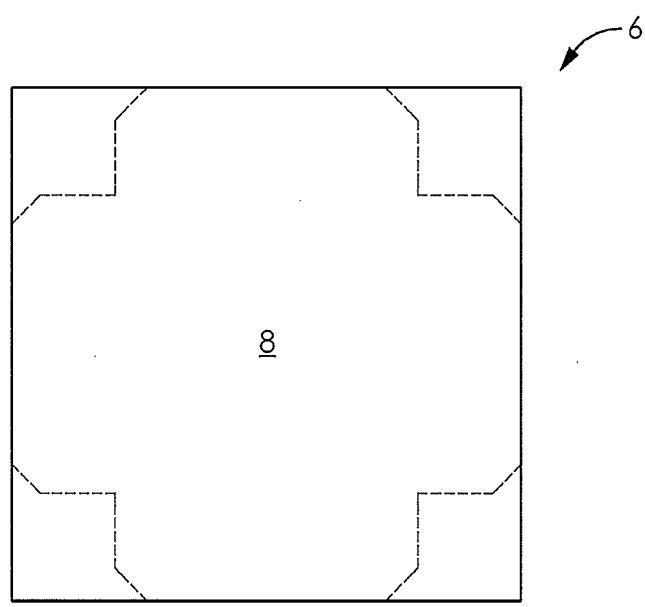
FIG. 6 is a top plan view of a cut out pattern for a cushion material for use with the portable cushion tray shown in FIGS. 1-5.
Figure 7:
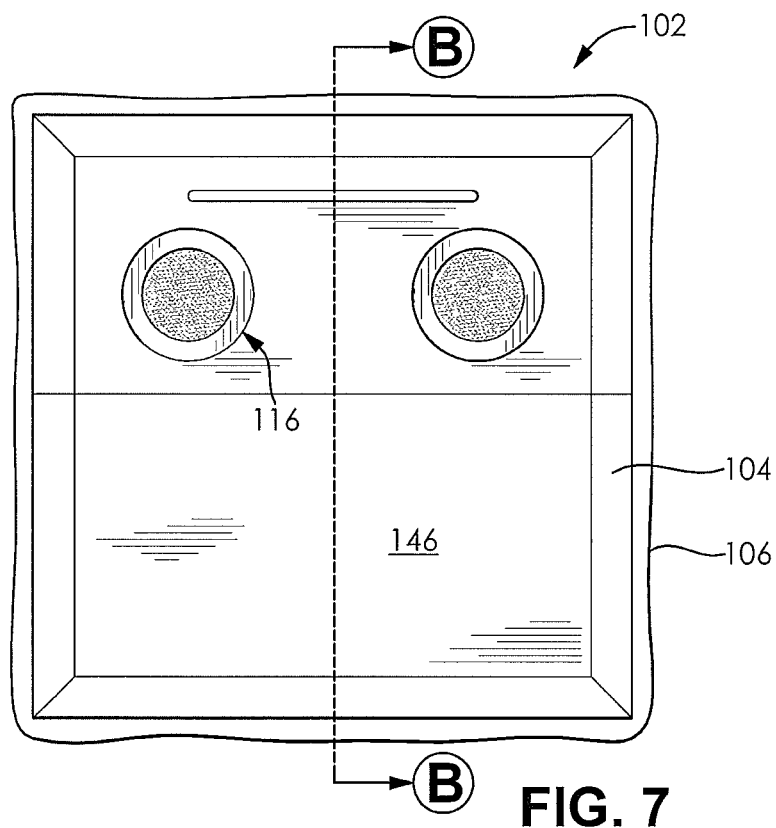
FIG. 7 is a top plan view of a portable cushion tray according to another embodiment of the present disclosure, further having a hinged door portion for selectively closing a compartment of the portable cushion tray.

Referring to FIG. 6, the upholstery material 8 may be cut to a pattern that facilitates an affixing of edges of the upholstery material 8 so that the resulting cushion 6 may be folded up and over edges of the backer board 12. Where the edges of the cushion 6 are folded up and over the edges the backer board 12, covers strips (not shown) may be used for aesthetic reasons to cover the exposed edges of the cushion 6. For example, where the backer board 12 has a substantially square or rectangular shape, the upholstery material 8 may be cut to provide four portions that can be upturned and hold the filler 10 when the edges of the four portions are affixed, for example, by sewing, mechanical fasteners, or adhesives.

With renewed reference to FIGS. 4-5, the portable cushion tray 2 is configured to hold at least one beverage container such as a cup, a can, a bottle, and a mug, as nonlimiting examples. As a further example, the tray 4 may include a first aperture 14 configured to hold the beverage container. The portable cushion tray 2 may further include a beverage container holder 16. Although two holders 16 are shown in the drawings, it should be appreciated that only one holder 16 or more than two holders 16 may also be In one embodiment, the holder 16 may be a molded plastic cup, in which the beverage container may be received. In another embodiment, the holder 16 is formed integrally with the backer board 12. The holder 16 may be formed from other suitable materials, as desired.

In a certain embodiment, the holder 16 may have an outwardly extending flange 18. The backer board 12 may also have a second aperture 20 within which the holder 16 is disposed. Where the holder 16 is disposed in the second aperture 20 of the backer board 12, and beneath the first aperture 14 of the tray 4, the flange 18 of the holder 16 is disposed between the tray 4 and the backer board 12. The flange 18 thereby secures the holder 16 within the portable cushion tray 2.

The first aperture 14 of the tray 4 and an upper surface 22 of the flange 18 of the holder 16 can further cooperate to form a shoulder surface 24. The shoulder surface 24 is configured to support another beverage container having a diameter larger than a diameter of the beverage container received by the holder 16 itself. It should be appreciated that the shoulder surface 24 permits the portable cushion tray 2 to receive two differently sized beverage containers. The shoulder surface 24 may be particularly suitable for receiving coffee mugs, for example, which may have a broader base than typical cups or cans that are received by the holder 16. Skilled artisans may select suitable diameters and shapes for the first aperture 14 and the holder 16, as desired.

In order to couple the various components of the portable cushion tray 2 together, it should be understood that various adhesives and mechanical fasteners may be employed. Suitable adhesives may include wood glues, acrylic adhesives, polyurethane adhesives, and epoxy adhesives, as nonlimiting examples. Suitable mechanical fasteners may include nails, staples, screws, and rivets, as nonlimiting examples. The various adhesives and mechanical fasteners used throughout the portable cushion tray 2 may be the same or different for each other, within the scope of the present disclosure.

In a particular embodiment, a first adhesive 26 is disposed between and abuts an upper surface 28 of the upholstery material 8 and the tray 4. A second adhesive 30 is disposed between and abuts a lower surface 32 of the upholstery material 8 and the backer board 12. A third adhesive 34 is disposed between and abuts the tray 4 and the backer board 12. It should be understood that each of the first adhesive 26 and the second adhesive 30 secures the holder 16 in place, as well as secures the upholstery material 8 to the tray 4. The third adhesive 34 likewise secures the tray 4 to the backer board 12. Each of the first adhesive 26, the second adhesive 30, and the third adhesive 34 may be provided as substantially continuous beads of adhesive, or as discontinuous or intermittent dots of adhesive, as desired.

Where the beverage container holder 16 is employed, a fourth adhesive 36 may be disposed between and abuts the upper surface 22 of the flange 18 of the holder 16 and the tray 4. The fourth adhesive 36 secures the holder 16 within the portable cushion tray 2. A sealant 40 is also disposed between and abuts a lower surface 42 of the flange 18 and the backer board 12. The sealant 40 militates against a leakage into the cushion 6 of either fluid from the beverage container, or from condensation that may collect on the beverage container and run into the holder 16. In one example, the sealant 40 is a silicone bead that circumscribes the holder 16 and prevents liquids from flowing through the second aperture 20. One of ordinary skill in the art understands that other suitable types of the sealant 40 may also be employed.

Although various sizes and locations of the adhesives are shown in the drawings for purposes of illustrating the invention, it should be understood that the adhesives shown are not drawn to scale and that more or less adhesive may be used to hold together the various components of the portable cushion tray 2, as desired.

In certain embodiments, the tray 4 of the portable cushion tray 2 has at least one elongate fluted joint 44 or groove formed therein. The elongate fluted joint 44 is configured to hold a writing instrument such as a pen or pencil. As an example, the elongate fluted join 44 is disposed between the at least one beverage container holder 16 and the first perimeter of the tray 4. Other locations and numbers of the elongate fluted joint 44 may also be used, as desired.

FIGS. 7-10 show the portable cushion tray 102 according to another embodiment of the present disclosure. Like or related structure relative to FIGS. 1-6, and shown in FIGS. 7-10, has the same reference number but in a 100-series for purpose of clarity.

The portable cushion tray 102 includes the tray 104 and the cushion 106. The tray 104 of the portable cushion tray 102 may include a door portion 146. The door portion 146 may be coupled to the portable cushion tray 102 with at least one hinge 148. For example, the door portion 146 may be selectively and hingedly lifted from the backer board 112. At least one of the door portion 146 and the backer board 112 may also include a fastener 150 to selectively hold the door portion 146 in a closed position. The fastener 150 may include a magnet, a clasp, or any other suitable mechanical device for selectively holding the door portion 146 closed.

Figure 8:
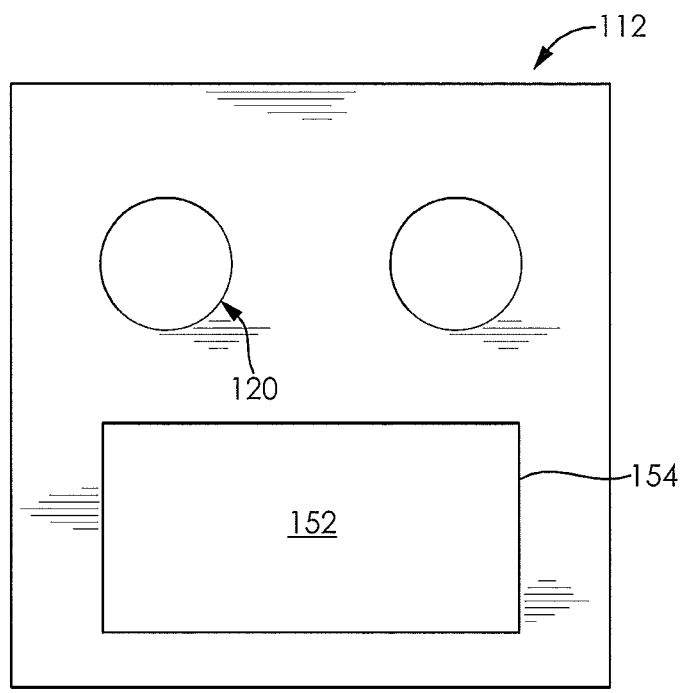
FIG. 8 is a top plan view of a back board for use with the portable cushion tray shown in FIG. 7.
Figure 9:
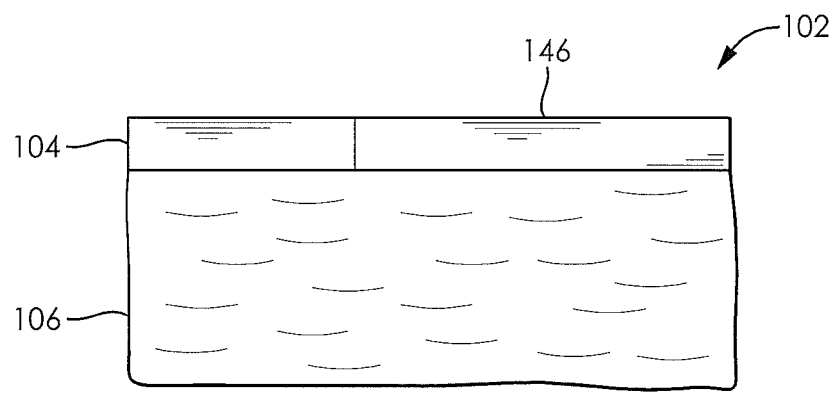
FIG. 9 is a side elevational view of the portable cushion tray illustrated in FIG. 7, and showing the hinged door portion in a closed position.
Figure 10:
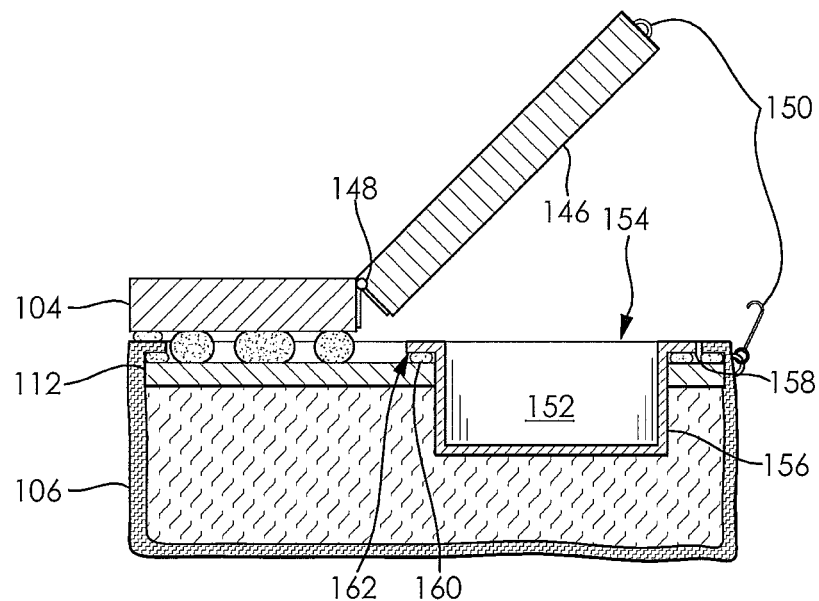
FIG. 10 is a side cross-sectional elevational view of the portable cushion tray taken along section line B-B in FIG. 7, and showing the hinged door portion in an open position to expose the underlying compartment.

The portable cushion tray 102 may further include a hidden compartment 152. The hidden compartment 152 is disposed beneath the door portion 146 of the tray 104 adjacent the at least one second aperture 120 of the backer board 112, for example, as shown in FIG. 8. The hidden compartment 152 is configured to hold miscellaneous objects such as remote controls for household entertainment equipment.

In particular embodiments, the backer board 112 includes a third aperture 154 through which a miscellaneous holder 156 may be disposed. The miscellaneous holder 156 may define the hidden compartment 152 of the portable cushion tray 102. Like the holder 116, the miscellaneous holder 156 may include a flange 158. The flange 158 may be disposed between the tray 104 and the backer board 112. Where the miscellaneous holder 156 with the flange 158 is used, a fourth adhesive 160 may be disposed between and abut a lower surface 162 of the flange 158 of the miscellaneous holder 156 and the backer board 112. The fourth adhesive 160 secures the miscellaneous holder 156 within the portable cushion tray 102.

Cover strips (not shown) may also be disposed over the exposed edges of the flange 158 for reasons of aesthetics. The cover strips may also be disposed over exposed edges of the cushion 106, also for reasons of aesthetics. Suitable adhesives or mechanical fasteners may be used to secure the cover strips, as desired.

Advantageously, the portable cushion tray 2, 102 of the disclosure can be used for a multitude of applications. As nonlimiting examples, the portable cushion tray 2, 102 can be used on a couch, a loveseat, floors, laps, in vehicles, camping, or anywhere else desired. The portable cushion tray 2, 102 can also be used as a food tray, an armrest, a drink holder, a reading and writing surface, a laptop holder, a coloring surface, and for crafts. Importantly, the portable cushion tray 2, 102 can be flipped over and used as a cushion, an armrest, or a headrest. It is also lightweight, easy to carry, easy to use, and easy to store While certain representative embodiments and details have been shown for purposes of illustrating the invention, it will be apparent to those skilled in the art that various changes may be made without departing from the scope of the disclosure, which is further described in the following appended claims.

What is claimed is:

1. A portable cushion tray, comprising:
  a tray having a first maximum perimeter, wherein the tray includes a door portion coupled to the portable cushion tray with at least one hinge, a hidden compartment disposed beneath the door portion of the tray;
  a cushion having a second maximum perimeter, the cushion coupled to the tray, and the first maximum perimeter one of the same as the second maximum perimeter and disposed inside of the second maximum perimeter, wherein the cushion includes an upholstery material enveloping a filler; and
  a backer board disposed between the upholstery material and the tray, wherein at least one of the door portion and the backer board includes a fastener, wherein the backer board includes an aperture through which a miscellaneous holder is disposed, the miscellaneous holder defining the hidden compartment of the portable cushion tray, wherein the miscellaneous holder includes a flange, the flange disposed between the tray and the backer board.

2. The portable cushion tray of claim 1, wherein the filler is a polyfill.

3. The portable cushion tray of claim 1, including an adhesive disposed between and abutting a lower surface of the flange of the miscellaneous holder and the backer board.

4. The portable cushion tray of claim 1, wherein the tray includes an elongate fluted joint configured to hold a writing instrument.

5. A furniture system, comprising:
  a furniture piece; and
  a portable cushion tray disposed on the furniture piece, the portable cushion tray including a tray having a first maximum perimeter, wherein the tray includes a door portion coupled to the portable cushion tray with at least one hinge, a hidden compartment disposed beneath the door portion of the tray, a cushion having a second maximum perimeter, the cushion coupled to the tray, and the first maximum perimeter one of the same as the second maximum perimeter and disposed inside of the second maximum perimeter wherein the cushion includes an upholstery material enveloping a filler; and a backer board disposed between the upholstery material and the tray, wherein at least one of the door portion and the backer board includes a fastener, wherein the backer board includes an aperture through which a miscellaneous holder is disposed, the miscellaneous holder defining the hidden compartment of the portable cushion tray, wherein the miscellaneous holder includes a flange, the flange disposed between the tray and the backer board.

* * * * *